(12) United States Patent
Rieger

(10) Patent No.: US 7,006,540 B2
(45) Date of Patent: Feb. 28, 2006

(54) METHOD AND SYSTEM FOR PROVIDING A PULSE LASER

(75) Inventor: Harry Rieger, San Diego, CA (US)

(73) Assignee: JMAR Research, Inc., San Diego, CA (US)

(*) Notice: Subject to any disclaimer, the term of this patent is extended or adjusted under 35 U.S.C. 154(b) by 324 days.

(21) Appl. No.: 10/434,017

(22) Filed: May 8, 2003

(65) Prior Publication Data
US 2003/0210717 A1 Nov. 13, 2003

Related U.S. Application Data

(60) Provisional application No. 60/378,847, filed on May 8, 2002.

(51) Int. Cl.
H01S 3/10 (2006.01)

(52) U.S. Cl. .......................... 372/25; 372/20
(58) Field of Classification Search ............... 372/20, 372/25–26
See application file for complete search history.

(56) References Cited

U.S. PATENT DOCUMENTS

| | | | |
|---|---|---|---|
| 3,614,655 A | | 10/1971 | Boulger |
| 3,928,818 A | * | 12/1975 | White ........................ 372/33 |
| 4,176,327 A | * | 11/1979 | Wayne et al. ................ 372/18 |
| 4,408,334 A | * | 10/1983 | Lundstrom .................... 372/98 |
| 4,546,477 A | * | 10/1985 | Richards ....................... 372/12 |
| 4,589,113 A | | 5/1986 | Hagelstein |
| 4,731,786 A | | 3/1988 | MacGowan et al. |
| 4,862,469 A | * | 8/1989 | Couillaud et al. ............ 372/33 |
| 5,046,184 A | * | 9/1991 | Chee et al. .................... 372/18 |
| 5,197,074 A | * | 3/1993 | Emmons et al. .............. 372/26 |
| 5,260,954 A | * | 11/1993 | Dane et al. .................... 372/25 |
| 5,272,708 A | * | 12/1993 | Esterowitz et al. ........... 372/20 |
| 5,272,713 A | | 12/1993 | Sobey et al. |
| 5,317,376 A | * | 5/1994 | Amzajerdian et al. ..... 356/28.5 |
| 5,317,574 A | | 5/1994 | Wang |
| 5,377,043 A | * | 12/1994 | Pelouch et al. ............. 359/326 |
| 5,499,282 A | | 3/1996 | Silfvast |
| 5,507,059 A | * | 4/1996 | Hohner ........................ 15/3.53 |

(Continued)

FOREIGN PATENT DOCUMENTS

JP 09331097 12/1997

(Continued)

OTHER PUBLICATIONS

Supplementary European Search Report—EP 03 72 6679.

Primary Examiner—Minsun Oh Harvey
Assistant Examiner—Phillip Nguyen
(74) Attorney, Agent, or Firm—Baker & McKenzie LLP

(57) ABSTRACT

The present application describes a system and method for providing a pulse laser may include a first reflector, a second reflector, a lasing module and a fast optical valve. The first reflector and the second reflector may form an optical cavity. The lasing module may be disposed at least partly in the optical cavity. A fast optical valve may be disposed at least partly within the optical cavity and structured to block and to allow lasing within the optical cavity. The fast optical valve may also be structured to output a laser pulse that has a pulse duration of approximately a round trip time of the optical cavity. By placing at least part of the first reflector or the second reflector on a moving element, the pulse duration of the outputted laser pulse can be manipulated easily.

23 Claims, 1 Drawing Sheet

U.S. PATENT DOCUMENTS

| | | |
|---|---|---|
| 5,569,916 A | 10/1996 | Tomie |
| 5,691,541 A | 11/1997 | Ceglio et al. |
| 5,730,811 A * | 3/1998 | Azad et al. ............... 148/565 |
| 5,825,847 A | 10/1998 | Ruth et al. |
| 5,963,616 A | 10/1999 | Silfvast et al. |
| 6,007,963 A | 12/1999 | Felter et al. |
| 6,035,015 A | 3/2000 | Ruth et al. |
| 6,108,357 A * | 8/2000 | Unternahrer ............... 372/25 |
| 6,160,273 A | 12/2000 | Fork et al. |
| 6,197,133 B1 * | 3/2001 | Unternahrer et al. ....... 148/525 |
| 6,580,732 B1 | 6/2003 | Guch, Jr. et al. |

FOREIGN PATENT DOCUMENTS

| | | |
|---|---|---|
| WO | WO01/52366 | 7/2001 |

\* cited by examiner

METHOD AND SYSTEM FOR PROVIDING A PULSE LASER

RELATED APPLICATION AND PRIORITY CLAIM

The present application is related to and claims priority from U.S. patent application Ser. No. 60/378,847 filed Aug. 5, 2002, incorporated herein by reference.

TECHNICAL FIELD

The present application describes systems and methods for providing pulsed laser, and specific embodiments for varying pulse duration of a pulsed laser without varying the energy per pulse.

BACKGROUND

Conventional laser systems can provide pulsed lasers. However, the pulse duration is dictated by specific design and is not an independent variable from the rest of the laser parameters. Thus, for example, in order to increase pulse duration, pump power typically is reduced. Unfortunately, reducing the pump power also reduces the energy per pulse.

What is needed is a convenient manner in which to vary pulse duration of a pulse laser without also varying the energy per pulse.

SUMMARY

The present application describes a system and method for providing pulsed laser. According to one embodiment, the pulse laser may include a first reflector, a second reflector, a lasing module and a fast optical valve. The first reflector and the second reflector may form an optical cavity that may be characterized by a round trip time. The lasing module may be disposed at least partly in the optical cavity. A fast optical valve may be disposed at least partly within the optical cavity and may be structured to block and to allow lasing within the optical cavity. The fast optical valve may also be structured to output a laser pulse that has a pulse duration of approximately the round trip time of the optical cavity.

The pulse laser system may also provide a movable element on which at least part of the first reflector or the second reflector may be mounted. By moving the element, the dimensions of the optical cavity may be changed. Accordingly, not only is the round trip time modified, but the pulse duration of the outputted laser pulse is also changed.

The pulse laser system may provide an advantage in that approximately all of the energy stored in the lasing activity of the optical cavity is output in a laser pulse independent of the pulse duration. Thus, the pulse duration can be varied without affecting the energy per pulse.

These and other features and advantages may be appreciated from review of the following detailed description, along with the accompanying figures in which like reference numerals refer to like parts throughout.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The embodiments of the present invention may be better understood, and its numerous objects, features, and advantages made apparent to those skilled in the art by referencing the accompanying drawings.

Figure 1:
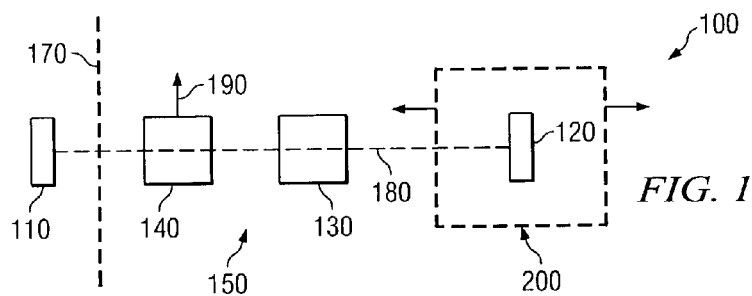
FIG. 1 illustrates a block diagram of one embodiment of a pulse laser system.

All of these drawings are drawings of certain embodiments. The scope of the claims is not to be limited to the specific embodiments illustrated in the drawings and described below.

DETAILED DESCRIPTION OF THE EMBODIMENTS

FIG. 1 shows an example of a pulse laser system 100 according to one aspect of the present invention. The pulse laser system 100 includes a first reflector 110, a second reflector 120, a lasing module 130 and a fast optical valve 140. The first reflector 110 and the second reflector 120 form an optical cavity 150. The fast optical valve 140 and the lasing module 130 are each at least partly disposed within the optical cavity 150. The lasing module 130 is structured to lase. The fast optical valve 140 is structured to block and to allow lasing within the optical cavity. The fast optical valve 140 is also structured to output a laser pulse that has a pulse duration of approximately a round trip time of the optical cavity.

The optical cavity 150 may be characterized, for example, by a round trip time. The round trip time may be defined as the time taken by light to make a round trip through the optical cavity 150. For example, light starting at plane 170 can make a round trip through the optical cavity 150 along, for example, an optical axis 180 by moving to the right and passing through the fast optical valve 140, the lasing module 130, being reflected by the second reflector 120, moving to the left and passing through the lasing module 130, the fast optical valve 140, the plane 170, being reflected by the first reflector 110 and moving to the right and returning to the plane 170. The time taken by the light to make the round trip is the round trip time.

In operation, the fast optical valve 140 is in a first mode such that lasing is blocked inside the optical cavity 150. The lasing module 130 receives energy from an external power source over a first time period and stores the energy as gain which may be many times larger than the lasing threshold, although lasing is still blocked by the fast optical valve 140. The first time period is long enough for the gain to reach, for example, a steady state level, a saturation level or a particular gain level. In one example, the lasing module 130 no longer receives energy from the external power source after the first time period.

At approximately the end of the first time period, the fast optical valve 140 switches to a second mode in which the optical cavity 150 is allowed to lase. Because of the sizeable gain stored in the lasing module 130, the optical cavity 150 begins to lase and reaches peak intensity in a relatively short time (i.e., after a second time period which is, for example, shorter than the first time period).

After approximately the second time period, the fast optical valve 140 switches to a third mode such that the fast optical valve 140 outputs from the optical cavity 150, a laser pulse 190 having a pulse duration of approximately the round trip time of the optical cavity 150. In one example, approximately all of the energy stored in the optical cavity is output in the form of a laser pulse having a pulse duration of the round trip time of the optical cavity 150.

Since the laser pulse duration is a function of the round trip time of the optical cavity 150, the laser pulse duration can be manipulated by changing the round trip dimensions of the optical cavity 150. For example, the second reflector 120 or a part thereof may be mounted on a moveable element (e.g., a moveable stage) 200 such that the round trip dimensions of the optical cavity 150 change by merely moving the element 200 relative to the first reflector 110. Thus, the pulse duration of the laser pulse 190 can be reduced in time by reducing the round trip dimension (i.e., in FIG. 1, moving the second reflector 120 closer to the first reflector 110). The pulse duration of the laser pulse 190 can be increased in time by increasing the round trip dimension (i.e., in FIG. 1, moving the second reflector 120 to the right (farther from the first reflector 110)). Alternatively, the first reflector 110 or a part thereof may be mounted on the element 200. Further, both the first reflector 110 and the second reflector 120 can be mounted on moveable elements to provide flexibility of adjusting the roundtrip duration from either end of the optical cavity 150. Alternatively, the reflectors can be configured to be moveable.

Figure 2:
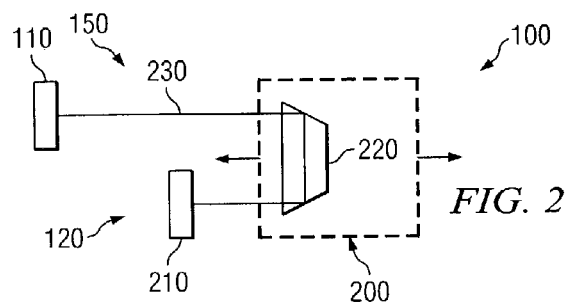
FIG. 2 illustrates some of the parts of one embodiment of a pulse laser system.

FIG. 2 shows some of the parts of an example of the laser pulse system 100. In this example, the optical cavity 150 is defined by first reflector 110 and the second reflector 120. The second reflector 120 includes a third reflector 210 and a Dove prism 220. A part of the second reflector 120, in particular, the Dove prism 220, is mounted on the moveable element 200. The path traveled by light in the optical cavity 150 is illustrated by an optical path 230.

The Dove prism 220 enhances the effect of moving the moveable element 200. Thus, when the moveable stage 200 is moved away from the first reflector 110 by a particular distance, the round trip distance of the optical cavity 150 is increased by four times the particular distance. Similarly, when the moveable stage 200 is moved toward the first reflector 110 by a particular distance, the round trip distance of the optical cavity 150 is decreased by four times the particular distance.

Figure 3:
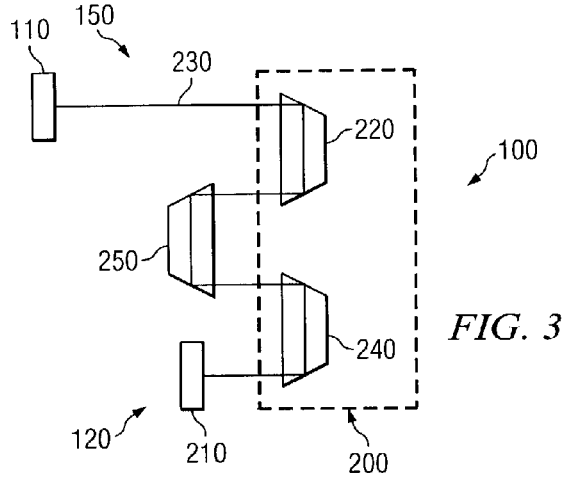
FIG. 3 illustrates some of the parts of an example of a pulse laser system according to the present invention.

FIG. 3 shows some of the parts of another example of a laser pulse system 100. In this example, the reflector 120 includes three Dove prisms 220, 240, 250 and the third reflector 210. Two of the Dove prisms 220, 240 are mounted on the moveable element 200. The path traveled by light in the optical cavity 150 is illustrated by the optical path 230.

This configuration of Dove prisms 220, 240, 250 further enhances the effect of moving the moveable element 200. Thus, when the moveable element 200 is moved away from the first reflector 110 by a particular distance, the round trip distance of the optical cavity 150 is increased by eight times the particular distance (i.e., twice the effect of the previous example). Furthermore, when the moveable element 200 is moved toward the first reflector 110 by a particular distance, the round trip distance of the optical cavity 150 is decreased by eight times the particular distance. Even more Dove prisms can be employed to further enhance the effect of moving the moveable element 200 by a particular distance.

Figure 4:
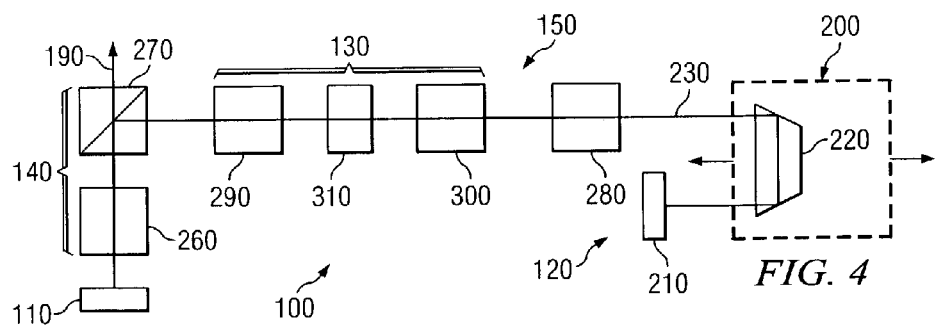
FIG. 4 illustrates a block diagram of one embodiment of a pulse laser system.

FIG. 4 shows an example of another embodiment of the pulse laser system 100. The pulse laser system 100 includes the first reflector 110, the second reflector 120, the lasing module 130 and the fast optical valve 140. The second reflector 120 includes the third reflector 210 and the Dove prism 220. Part of the second reflector 120, in particular, the Dove prism 220, is mounted on the moveable element 200. The Dove prism may be advantageous because dove prisms are largely insensitive to horizontal alignments. Vertical alignment insensitivity can be enhanced by replacing the third reflector 210 with a porro prism. The fast optical valve 140 includes a cavity dumper 260, a polarizer 270 and a Q-switch 280. The cavity dumper 260 can be activated to transform light characterized by a first polarization into light characterized by a second polarization. In one example, the cavity dumper 260 includes a Pockels cell that is characterized by a quarter wave per pass retardation. The polarizer 270 is structured to reflect light characterized by the first polarization and to pass light characterized by the second polarization. The Q-switch 280 is structured to switch between not allowing lasing in the optical cavity 150 to allowing lasing in the optical cavity 150. The lasing module 130 includes a first diode pumped head (e.g., Nd:YAG head having an Nd:YAG rod) 290, a second diode pumped head 300 and a thermal stress birefringence compensator 310 (e.g., a 90 degree rotator).

In operation, during a first time period, the dual heads 290, 300 are optically pumped by respective laser diodes. Lasing does not occur in the optical cavity 150 because the Q-switch is set such that it does not allow lasing in a manner known to one of ordinary skill in the art. Since no lasing occurs while the dual heads 290, 300 are pumped, the lasing module 130 builds up gain that can be much greater than the lasing threshold gain. At approximately the end of the first time period, the Q-switch 280 is switched such that it does allow lasing. Since the dual heads 290, 300 have excessive gain, lasing takes place and a peak intensity is reached in a very short time (i.e., after approximately a second time period). In one example, peak intensity is achieved in less than approximately 50 nanoseconds (ns). The use of the dual heads 290, 300 with the 90 degree rotator 310 disposed therebetween allows for minimizing the polarization rotation due to birefringence under high pump conditions. The polarizer 270 is set to reflect light of a first polarization (e.g., vertical polarization). Thus, the laser light trapped in the optical cavity 150 is characterized by the first polarization and follows the optical path 230.

In a subsequent third time period, the cavity dumper 260 is actuated such that light characterized by the first polarization is transformed into light characterized by the second polarization. In one example, this transformation occurs over two passes. Thus, light characterized by the first polarization is passes twice through the cavity dumper 260 via the first reflector 110. After the second pass through the cavity dumper 260, the light now characterized by the second polarization (e.g., horizontal polarization) is not reflected by the polarizer 270, but instead passes through the polarizer as an output laser pulse beam. Thus, the laser light in the optical cavity 150 exits the optical cavity 150 via the polarizer 270 in one round trip. In the example in which the pumping of the dual heads 290, 300 ends at approximately the end of the second time period, approximately all of the laser energy stored in the optical cavity 150 is output as a laser pulse of time duration approximately equal to the round trip time of the optical cavity 150. Furthermore, by moving the element 200 the round trip time of the optical cavity 150 can be easily changed and thus the pulse time duration of the laser pulse can be easily changed. However, even though the pulse time duration can be easily changed, the energy per pulse does not change.

Thus, it is seen that systems and methods for providing a pulse laser are provided. One skilled in the art will appreciate that the present invention can be practiced by other than the preferred embodiments which are presented in this description for purposes of illustration and not of limitation, and the present invention is limited only by the claims that follow. It is noted that equivalents for the particular embodiments discussed in this description may practice the present invention as well.

One skilled in the art will appreciate that the equations described here in can be processed using various methods (e.g., by a processing system coupled to the optical signal processing system or the like) as described herein to determine the characteristics of optical signals. A few preferred embodiments have been described in detail herein. It is to be understood that the scope of the invention also comprehends embodiments different from those described, yet within the scope of the claims. Words of inclusion are to be interpreted as nonexhaustive in considering the scope of the invention. While this invention has been described with reference to illustrative embodiments, this description, is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

The section headings in this application are provided for consistency with the parts of an application suggested under 37 CFR 1.77 or otherwise to provide organizational cues. These headings shall not limit or characterize the invention(s) set out in any patent claims that may issue from this application. Specifically and by way of example, although the headings refer to a "Field of the Invention," the claims should not be limited by the language chosen under this heading to describe the so-called field of the invention. Further, a description of a technology in the "Description of Related Art" is not be construed as an admission that technology is prior art to the present application. Neither is the "Summary of the Invention" to be considered as a characterization of the invention(s) set forth in the claims to this application. Further, the reference in these headings to "Invention" in the singular should not be used to argue that there is a single point of novelty claimed in this application. Multiple inventions may be set forth according to the limitations of the multiple claims associated with this patent specification, and the claims accordingly define the invention(s) that are protected thereby. In all instances, the scope of the claims shall be considered on their own merits in light of the specification but should not be constrained by the headings included in this application.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

While particular embodiments of the present invention have been shown and described, it will be clear to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A pulse laser system, comprising:
   an optical cavity formed by a first reflector and a second reflector, the optical cavity being characterized by a round-trip time, wherein one or more of the first and second reflectors are movable along the length of the optical cavity so that the duration of the outputted laser pulse is a function of a position of the first and second reflectors;
   a lasing module disposed at least partly within the optical cavity, the lasing module comprising a first diode pumped head, a second diode pumped head, and a birefringence compensator disposed between the first and second diode pumped heads; and
   a fast optical valve disposed at least partly within the optical cavity, the fast optical valve being structured to block and to allow lasing within the optical cavity and being structured to output a laser pulse that has a pulse duration of approximately the round trip time of the optical cavity.

2. The system according to claim 1, wherein the first and second diode heads comprise a Nd:YAG rod and at least one laser diode.

3. The system according to claim 1, wherein the birefringence compensator includes a ninety degree rotator.

4. The system according to claim 1, wherein the fast optical valve includes a polarizer and a cavity dumper.

5. The system according to claim 4, wherein the polarizer is structured to reflect light characterized by a second polarization and permit the passage of light characterized by a first polarization, and
   wherein the cavity dumper has a first operational mode that blocks lasing within the optical cavity, a second operations mode that permits lasing within the optical cavity, and a third operational mode that changes the polarization of the light passing through the cavity dumper from a second polarization to a first polarization.

6. The system according to claim 5, wherein the cavity dumper imparts a quarter wave per pass retardation of the light passing through the cavity dumper so that light having a second polarization is changed into light having a first polarization after passing through the cavity dumper twice.

7. The system according to claim 1, wherein the fast optical valve includes a Q-switch.

8. The system according to claim 1, wherein one or more of the round trip time is a function of a position of the movable element.

9. The system according to claim 1,
   wherein the second reflector includes a third reflector and a fourth reflector, wherein one or more of the first, third and fourth reflectors are movable, and wherein the first reflector, the third reflector and the fourth reflector are disposed along the same optical path.

10. The system according to claim 9, wherein the round trip time changes as a function of a position of the one or more of the first, third and fourth reflectors that are movable.

11. The system according to claim 9, wherein the duration of the outputted laser pulse is a function of a distance between the first reflector and the fourth reflector along the optical path via the third reflector.

12. The system according to claim 9, wherein the third reflector is at least one dove prism.

13. The system according to claim 9, wherein the third reflector is structured to be substantially insensitive to horizontal misalignments.

14. The system according to claim 9, wherein the fourth reflector is structured to be substantially insensitive to vertical misaligmnents.

15. The system according to claim 9, wherein the third reflector includes a first set of at least one dove prism, and wherein the fourth reflector includes a second set of at least one dove prism.

16. The system according to claim 15, wherein the first set includes more dove prisms than the second set.

17. The system according to claim 15, wherein the fourth reflector includes a first high reflectivity mirror, and wherein the first reflector includes a second high reflectivity mirror.

18. The system according to claim 1, wherein the pulse duration can be modified without substantially affecting energy per pulse.

19. A method for providing a laser pulse, comprising the steps:

blocking lasing within an optical cavity with a cavity dumper operating in a first mode, pumping a lasing material within an optical cavity with a lasing module comprising a first diode pumped head, a second diode pumped head, and a birefringence compensator disposed between the first and second diode pumped heads;

allowing lasing within the optical cavity with a cavity dumper operating in a second mode at approximately an end of the first duration;

allowing lasing to reach a peak intensity after a second duration;

outputting laser pulse with a cavity dumper operating in a third mode wherein the cavity dumper changes the polarization of the light passing through the cavity dumper from a second polarization into a first polarization, wherein the laser pulse having pulse duration approximately equal to a round trip time of the optical cavity;

changing the round trip time of the optical cavity by moving one or more reflectors disposed in the optical cavity.

20. The method according to claim 19, wherein the step of outputting includes the step of outputting approximately all of energy stored in the optical cavity in the laser pulse.

21. The method according to claim 19, further comprising the step of: changing the pulse duration by changing the round trip time of the optical cavity.

22. The method according to claim 19, further comprising the step of: changing the pulse duration by changing an optical length of the cavity.

23. The method according to claim 19, further comprising the step of: changing the pulse duration without changing the energy per pulse.

* * * * *

UNITED STATES PATENT AND TRADEMARK OFFICE
CERTIFICATE OF CORRECTION

| | | |
|---|---|---|
| PATENT NO. | : 7,006,540 B2 | Page 1 of 1 |
| APPLICATION NO. | : 10/434017 | |
| DATED | : February 28, 2006 | |
| INVENTOR(S) | : Harry Rieger | |

It is certified that error appears in the above-identified patent and that said Letters Patent is hereby corrected as shown below:

Column 6, Line 38, Claim 2, insert -- pumped -- after "diode".

Column 7, Line 19, Claim 14, delete "misaligmnents" and insert in lieu thereof -- misalignments --

Signed and Sealed this

Twenty-seventh Day of March, 2007

JON W. DUDAS
*Director of the United States Patent and Trademark Office*